United States Patent [19]

Lusk et al.

[11] 3,716,652
[45] Feb. 13, 1973

[54] SYSTEM FOR DYNAMICALLY COOLING A HIGH VOLTAGE CABLE TERMINATION

[75] Inventors: George E. Lusk, Downers Grove; James H. Nicholas, Flossmoor, both of Ill.

[73] Assignee: G & W Electric Specialty Company, Blue Island, Ill.

[22] Filed: April 18, 1972

[21] Appl. No.: 245,211

[52] U.S. Cl.............174/15 R, 174/15 BH, 174/19, 174/20, 174/DIG. 10
[51] Int. Cl.............................................H01b 7/28
[58] Field of Search......174/14 BH, 15 BH, 16 BH, 15 R, 174/15 C, 20, 19, 21 R, 22 R, 22 C, 23 R, DIG. 10

[56] References Cited

UNITED STATES PATENTS

| 3,143,591 | 8/1964 | Flamand | 174/19 X |
|---|---|---|---|
| 3,214,544 | 10/1965 | Leeds | 174/DIG. 10 |
| 3,286,021 | 11/1966 | Kock | 174/19 X |
| 3,548,075 | 12/1970 | Buroni | 174/20 |
| 1,983,370 | 12/1934 | Hillebrand | 174/14 BH |

FOREIGN PATENTS OR APPLICATIONS

| 82,341 | 7/1956 | Netherlands | 174/15 BH |
|---|---|---|---|
| 1,196,496 | 11/1959 | France | 174/15 BH |
| 541,444 | 10/1955 | Belgium | 174/15 BH |
| 373,987 | 8/1939 | Italy | 174/15 BH |
| 988,030 | 3/1965 | Great Britain | 174/15 C |
| 622,506 | 6/1961 | Canada | 174/15 C |

Primary Examiner—Bernard A. Gilheany
Assistant Examiner—A. T. Grimley
Attorney—William E. Anderson et al.

[57] ABSTRACT

A dynamically cooled high voltage cable termination with a pothead, and a hollow core conductor cable, employs a circulating insulating liquid dielectric through a closed loop system having flow passages within the cable conductor core and a heat exchanger external to the pothead structure. The heat exchanger and other associated components may be disposed at the normally high voltage end of the pothead. The current carrying capacity of the cable within the pothead is thereby effectively increased, together with the energy transferring capabilities of the cable system with which it is associated, without degradation of the dielectric characteristics of the cable termination.

19 Claims, 4 Drawing Figures

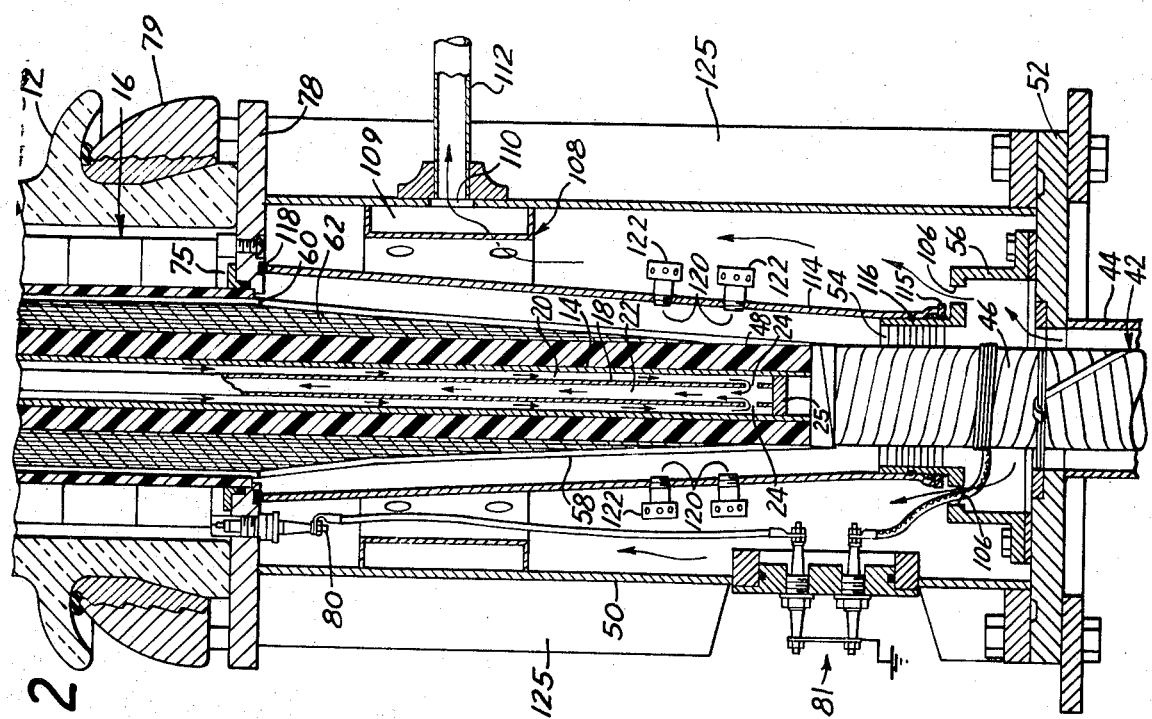
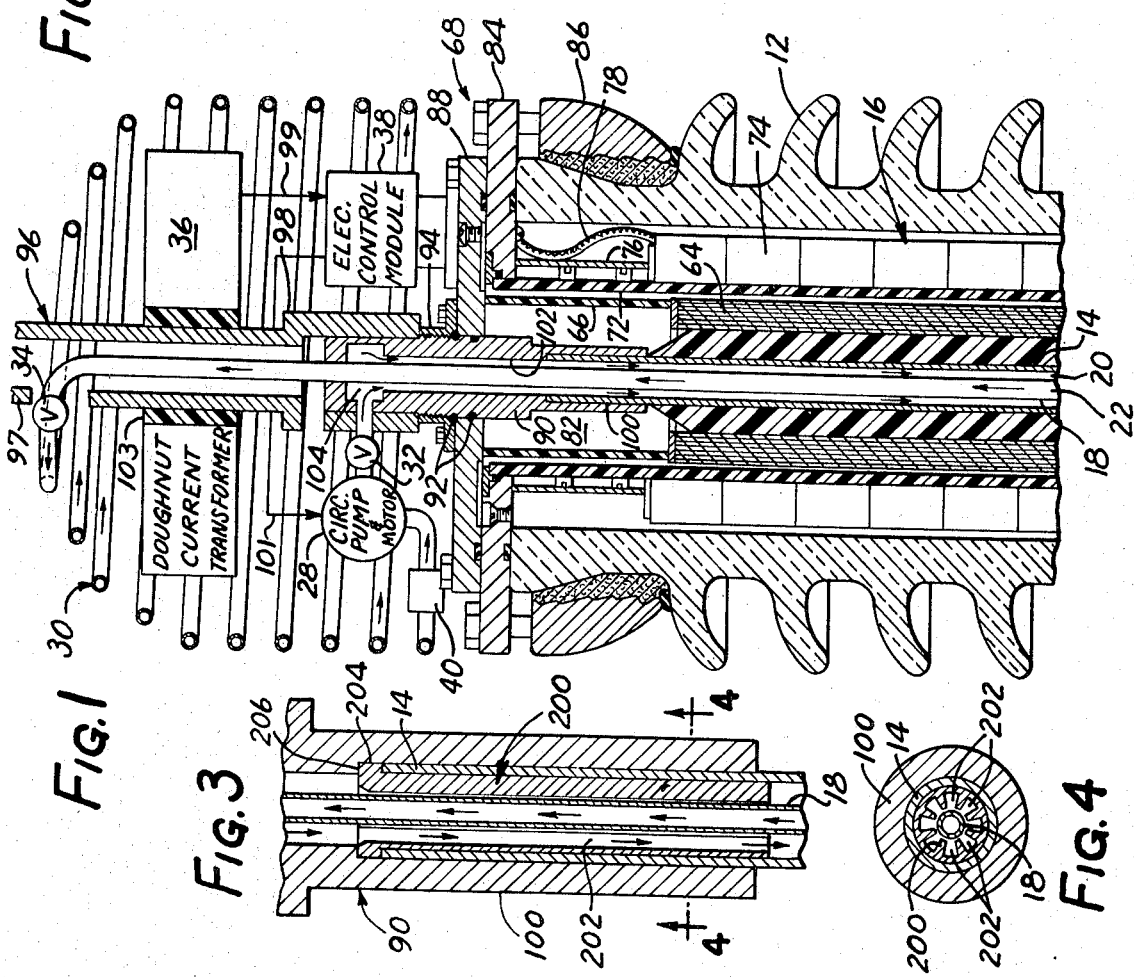

SYSTEM FOR DYNAMICALLY COOLING A HIGH VOLTAGE CABLE TERMINATION

The present invention relates to high voltage cable terminations, and to a system for dynamically cooling them. More particularly, the present invention is embodied in a high voltage pothead cable termination having a complete self-contained dynamic cooling system.

The word "pothead" has been commonly used in the industry interchangeably with cable termination, terminator or terminal. The term "cable termination" will be used throughout this application to cover the complete assembly of cable, riser pipe, support structure, etc., as it would be ready for service. The term "pothead" will be used to cover the device and materials normally supplied by the manufacturer to terminate the cable in the field. An Institute of Electrical and Electronic Engineers (I.E.E.E.) Number 48 "Standard For Potheads," issued May, 1962, generally covers the terminology for these devices.

In the transmission and distribution of electrical energy by means of underground or subterranean power cable, it is common practice to employ a high pressure, oil filled, pipe-type cable system which may be used for the transmission and distribution of considerable blocks of electrical energy. Where only dielectric strength and protection of the cable are significant, and no forced cooling is required to achieve the required electrical power transfer, such a system typically employs a static hydraulic pressure, with oil being pumped into or discharged from the pipe (and certain related components) to maintain the oil-immersed cable insulation under a given pressure, such as of the order of 200 psi.

However, it is often the case that a dynamic or circulating hydraulic oil system is used with such pipe cable systems to increase the current carrying capacity of the cable for a given conductor size, the oil then being circulated through the pipe and some type of heat exchanger by a pump, while still maintaining, for example, the same pressure of about the order of 200 psi.

Although the capability of such underground cable systems to transmit the electrical energy is influenced by a number of different factors, generally the most important are those relating to thermal conditions. Thus, the current carrying capacity of such a system for a given cable conductor size is typically increased considerably by employing such an oil circulating system with heat exchangers to generally remove heat from the oil, and thus from the cable, and to avoid the generation of "hot spot" temperatures. The cable heat generation is, in the more common pipe cable systems, primarily due to $I^2R$ losses in the cable which increase rapidly with current, and also increase with temperature. In the E.H.V. (extra high voltage) class of pipe cable systems, dielectric losses in the cable insulation may contribute appreciable heating.

While the construction of such a dynamic pressure hydraulic system is relatively easily accomplished for cooling the major part of the pipe cable system (e.g., through the underground pipes, spreader heads, risers, etc.), oil circulation through the cable terminations at potheads presents very substantial problems because of material differences in basic structure and design considerations from those involved in the pipe cable system, itself. This is especially so for high voltage potheads rated, for example, at 138 KV. and higher. In fact, as discussed in greater detail hereinafter, many of the structural features involved in the basic design criteria for such potheads, such as those required for high resistance to dielectric breakdown and maximum electrical insulation, are contrary and adverse to the desired structural features which would readily accommodate a circulating oil coolant through the cable termination and pothead structure.

More particularly, the oil flow through the pipe cable portion of the system is typically conducted through a space which is relatively large so that the flow passages or channels are not generally restrictive to the flow of oil. And, also, any reduction in dielectric strength due to any metal or semiconductive particles or other factors associated with the oil flow are not especially critical since the high voltage gradient is not normally applied across the bulk oil. For example, in a typical oil filled pipe-type cable, the electric field would essentially be confined between the central cable conductor and the shield, and the oil flow would take place in the space between the shield and the inside diameter of the pipe. Although in some installations, an oil filled hollow core type of cable may be employed, in such core type cable systems, the high voltage field stresses are still not present across the oil because it flows along a central or axial passage or duct located within the cable conductor, itself. Generally, a semi-stop structure is incorporated into the base of the pothead and check valve-filter units are used to filter the oil which may enter the pothead zone. Also, there is generally little problem providing passages with large enough cross sectional areas to pass a sufficient oil flow to obtain the desired cooling of the cable in such oil filled cable systems.

However, at the cable terminations, a completely different situation exists, and it is not practicable for several reasons to merely conduct this cable system oil through the pothead. First, due to the necessary electrical insulating and dielectric requirements of the cable termination and pothead structure, there is generally a considerable amount of electrical insulation, and consequently thermal insulation, in the radial heat flow path from the cable conductor to the air or other ambient media at the exterior surface of the pothead. This insulation is present since most high voltage cable terminations require the use of stress relief cone insulation and/or stress controlling capacitors in addition to the insulation already included on the cable conductor, and high dielectric insulating qualities are required in the insulative components used in the termination construction.

Second, although most high voltage potheads are hermetically sealed and contained oil under high static pressure conditions for dielectric reasons and to exclude moisture entry, any oil channels or ducts within the stress controlling insulations, and/or capacitors voltage grading arrangement, must be kept quite small because the dielectric breakdown strength of the oil decreases substantially when it is not separated into relatively thin zones or laminations of oil and solid dielectric materials. The thermal conductivity of the oil, on the other hand, is increased only when the layer is sufficiently thick to permit convection currents to flow, and thus although very thin oil layers are required for good dielectric characteristics, they produce a very low thermal conductivity which impairs the normal cooling of the conductor by radial heat flow through the termination. Therefore, the radial gaps between the stress controlling components of the termination are desirably kept to a minimum with very close spacings, and this results in the dielectric requirements being generally at odds with the cooling requirements; especially, since the channels or ducts within the pothead would need to be large enough to permit sufficient coolant flow for adequate heat removal without degrading the dielectric characteristics of the termination.

Furthermore, the forced circulation of some insulating liquids, such as the oil typically employed in oil filled cable systems, through the pump, heat exchanger, and associated piping, may produce a deleterious effect upon the dielectric characteristics of the liquid. For example, several metals, in the presence of some mineral or insulating liquids, may act as catalytic agents causing the formation of hydroperoxide compounds which cause an increase in the power factor of the insulating liquids at high temperatures. Generally, this catalytic action of the metal is increased by higher temperatures and velocity of flow of the insulating liquid. Copper may be the most active catalytic metal normally associated with high voltage cables, but steel (which may be typically used in pipe cable systems) is also catalytically active. Thus, these effects contribute further to the substantial problems involved in dynamically cooling high voltage terminations, and especially in using a common oil system with the pipe cable and/or riser.

Therefore, considering the relatively high thermal resistance in the radial heat flow path from the cable conductor to the outer surface of the pothead, and the severe restrictions on forced internal cooling, the cable terminations may place significant limitations on the current carrying capacity of the overall oil filled cable system, especially where the other portions of the system employ dynamic cooling and are thus not so limited.

In copending application, Ser. No. 234,898, filed Mar. 15, 1972, of the present inventors, there is disclosed a system and method for dynamically cooling a cable termination wherein an insulating liquid dielectric is axially circulated through the pothead in regions of relatively low field strength, and particularly in regions radially located between the stress controlling insulations and the outer insulator.

It is an object of the present invention to provide an improved system for dynamically cooling high voltage cable terminations by the circulation of oil, or other insulating liquid or coolant fluid, through a pothead without affecting any of the regions within the pothead between the conductor and the outer insulator, so that there is essentially no effect on the normal or designed dielectric characteristics of the cable termination, but the current carrying capacity of the cable within the pothead for a given cable conductor size is considerably increased.

It is another object of the present invention to provide a dynamically cooled termination which is capable of functioning as a generally self-contained and self-controlling system.

Other objects and advantages of the present invention will become apparent from the following detailed description, taken in conjunction with the accompanying drawings, in which:

FIG. 1 is a partial sectional view of the upper portion of a cable termination constructed in accordance with the present embodiment of the invention, with portions of the cooling system thereof shown schematically;

FIG. 2 is a partial sectional view of the lower portion of the termination of FIG. 1;

FIG. 3 is a partial longitudinal sectional view of a portion of the cable termination shown in FIG. 1, showing certain structure in greater detail; and FIG. 4 is a sectional view taken along line 4—4 in FIG. 3, in the direction of the arrows.

Referring now to FIGS. 1 and 2, there is shown a system for dynamically cooling an electric cable termination 10 having an outer porcelain insulator 12, a hollow core conductor 14 extending along the pothead axis, and stress controlling insulation and capacitors, generally designated as 16, disposed about the cable conductor 14 within the outer insulator 12. A flow tube 18, having an outside diameter substantially less than the inside or core diameter of the cable conductor 14, is disposed within the hollow conductor 14 so as to define an annular space 20 between the tube 18 and the conductor 14. The annular space 20 forms a first flow passage and the interior 22 of the tube 18 forms a second flow passage, the flow direction for each passage in the illustrated embodiment being respectively shown by the corresponding arrows for respective downward and upward axial flow through the pothead. One or more ports 24 are located in the tube 18, at the lower end thereof, and communicate between the first and second flow passages, 20 and 22 respectively, the end of the flow passages being restricted by a plug 25 which limits flow in the termination portion of the conductor 14 beyond the lower end of the tube 18.

Cooling means, generally designated as 26 at the pothead hood and connector section, are coupled to the annular space 20 and to the tube 18 at the upper respective ends of the flow passages 20 and 22 for circulating an insulating liquid dielectric coolant through a closed loop including the first and second flow passages 20 and 22, a circulating pump 28 and heat transfer means 30 for cooling the insulating liquid. In the illustrated embodiment, the portion of the loop within the pothead is confined substantially to the interior of the hollow conductor, although some flow of the insulating liquid may take place through the conductor strands, etc., to or from the other oil filled zones of the structure. The heat transfer means 30 is shown in the illustrated embodiment as a coiled heat exchanger tube coupled between the first and second flow passages 20 and 22 by respective valves 32 and 34, the coiled tube 30 as well as the pump 28 being located at the normally high voltage end of the pothead. The circulating pump 28 preferably includes an electric driving motor within a common housing, and the system comprises means, illustrated as a current transformer 36 and electronic control module 38, for deriving electrical energy from the conductor 14 to energize the pump driving motor.

The closed loop system also includes a filter 40 at the lower end of the coil 30, just before the intake to the pump 28, which employs molecular sieve materials and/or activated clays to remove undesirable particles and/or other substances which may be present in the insulating liquid by mechanical action and selective adsorption. The filter thus maintains the dielectric qualities of the insulating liquid.

The coil 30 is generally helical, and spirals out at valve 34 from a minimum radius to a maximum radius generally coextensive with the radial dimensions of the pothead, so as to generally form a dome or "beehive" shaped configuration which encloses the components of the cooling means 26. The generally dome shape of the cooling coil 30 serves as a corona shield which is typically employed at the hood section or normally high voltage end of conventional potheads. Consequently, the coil 30 is in direct heat transfer relation to the ambient air and the liquid flowing therethrough is cooled by the wind and normal air convection currents which pass across it. The overall structure is thus generally a self-contained system forming a complete dynamically cooled high voltage cable termination. The heat is removed directly from the cable conductor, which is the principal heat source, without requiring radial heat flow through the cable termination and without degrading the termination dielectric characteristics.

More particularly, by referring to FIG. 2, the hollow conductor 14 is part of a conventional cable construction 42 of, for example, 2,000 MCM (or other suitable size) hollow core or segmental hollow core type, typically having a core of between ½ to ¾ inch diameter disposed along the cable axis and forming an oil passage or duct along the length of the cable. Such cables may typically have successive layers of inner insulation (e.g., oil impregnated paper) and a ground potential shield of wrapped half-lapped copper tapes enclosed in a self-contained lead or aluminum sheath or three cables contained in a steel pipe. The cable 42 is shown herein fully installed in a more or less standard manner, where the potion of the cable extending up from the riser pipe 44 has been prepared for the termination by conventional techniques.

The cable is shown with exposed shielding tape 46 and insulation 48, the shielding 46 being connected to the pothead body section 50 at ground potential in a conventional manner. The prepared cable end passes through the entrance opening in the base plate 52 and through a gland 54 supported by inner entrance member 56 bolted to the inside surface of the base plate 52 in concentric relation to the opening. The gland 54 forms an oil semi-stop seal against the cable shield 46.

The shield is terminated in a stress relief cone formed from a perforated stress control paper roll covered with a woven wire cloth braid 58 and supported by generally vertical straps (not shown) spaced circumferentially about the cable in a spaced apart arrangement and held together by wire servings disposed within cutout offsets spaced axially along the cone. The details of the stress relief cone and shield termination do not form any part of the present invention, and thus are not shown in the drawings, but they are generally shown in the aforesaid copending application. The upper end of the cloth braid shielding 58 is terminated at 60 typically with a band of copper and paper tape.

The stress control paper roll, shown generally as 62, is disposed in the usual manner about the cable insulation 48 and extends upwardly along the cable a substantial distance. An auxiliary blocking paper roll 64 is placed in abutment (not shown) with the upper end of the stress control paper roll 62 and terminates in proximity to the bared end of the conductor 14 near the upper end of the pothead, so that the insulation 48 of the cable is effectively surrounded with paper over substantially its entire length within the pothead. The auxiliary paper roll 64 is maintained in position by a blocking cylinder 66 clamped between the upper end of the roll 64 and the upper cover plate assembly 68. Capacitor stack barrier support tube 72 is concentrically disposed about the paper rolls and a small gap is defined therebetween. Capacitor stack 74, comprising a multitude of annular capacitors elements, is concentrically disposed about the support tube 72 within the concentric bore wall of the outer porcelain insulator 12 and spaced therefrom to define a further gap in accordance with known pothead construction. The capacitor stack 74 is clamped between a blocking cylinder 76 at its upper end (abutting cover assembly 68) and support rings 75 on support plate 78 at its lower end. Support plate 78 is bolted to lower insulator flange 79 in conventional fashion. Suitable electric terminal connections are made to the upper and lower ends of the capacitor stack by leads 78 and 80 respectively. The upper capacitor lead 78 is connected by a threaded fastener to the cover assembly 68, which is normally at the high voltage of the cable conductor. The lower capacitor lead 80 is mounted through a bushing extending into the body section 50 and connected to one of two measurement bushings 81, the other of which is connected to the grounded cable shield 46, as shown. The terminals of both measurement bushings are normally connected together and have an external jumper to ground, but may be used for periodic dielectric measurement purposes in the conventional manner.

The paper rolls are, of course, impregnated with oil (or other dielectric) forming very thin oil layers of high dielectric strength, and the gap defined between the outer surfaces of the paper rolls and the capacitor stack barrier support tube, as well as the gap between the capacitor stack and porcelain insulator bore, are also filled with oil. An oil-impregnated, crepe paper tape insulation may be wrapped over the entire outer cylindrical surface formed by the capacitor stack 74. The blocking cylinder 66 is slotted (not shown) to permit the cavity 82 generally defined therewithin to be filled with oil, as are all of the remaining zones within the interior space of the pothead, including the interior of the metal body section 50. As will be described in greater detail hereinafter, the oil is generally maintained under a static pressure of between 200 to 300 psi and the pothead structure is hermetically sealed.

Turning now more particularly to the hood and connector section of the pothead, the upper cover plate assembly 68 comprises a stainless steel ring 84 which is bolted to upper insulator flange 86 and a stainless steel cover plate 88 which is bolted to the ring 84. Suitable gaskets and seals, as shown, are disposed between these members and the upper end of the porcelain insulator 12 to form a hermetic seal therebetween. The cover plate 88 contains a central aperture through which is positioned and mounted a conductive connector 90. O- ring seals 92 are provided about the connector where it engages the aperture bore, as shown. A metal collar 94 is bolted to the upper surface of the cover plate 88 about the aperture, and the connector 90 extends through the collar and may be in threaded engagement therewith to retain the connector in place. An aerial connector stub 96 has a lower hollow cylindrical portion 98 in tight frictional engagement with the upper part of the connector 90 and in abutment with the upper edge of the collar 94. The connector stub 96 also has an upper hollow cylindrical portion 97 of reduced diameter which extends upwardly beyond the top of the coil 30 and is adapted at its top end to receive and make connection to a non-insulated aerial conductor in conventional fashion.

The connector 90 has a compression or soldering type ferrule 100 at its lower end which receives the bared end of the cable conductor 14, and an axial bore 102 of reduced diameter extends to an intake chamber 104 near the upper end of the connector 90. Appropriately aligned apertures are provided in the respective cylindrical walls of the connector 90 and connector stub 96 so that the discharge outlet of lower valve 32 communicates directly with the intake chamber 104 to provide insulating dielectric liquid flow to the downward flow passage 20 about the flow tube 18.

The connector and cable conductor assembly is illustrated in a rather simplified manner in FIG. 1 for clarity of illustration, but an example of a compression type of connection is shown in greater detail in FIGS. 3 and 4. As shown in FIGS. 3 and 4, a steel core support tube 200 is disposed within the lower or ferrule portion 100 of the connector 90 and within the end of the hollow core cable conductor 14 so as to support the cable conductor when the connector ferrule is compressed onto the cable conductor for electrical connection and mechanical support. The interior of the core support tube 200 comprises longitudinal flutes 202 which define a plurality of oil channels in the downward flow passage 20 about the flow tube 18. A flange 204 extends from the upper end of the support tube between the upper end of the cable conductor 14 and an abutting radially extending surface 206 of the connector 90 to form a mutually supporting arrangement.

Alternatively, a suitably modified connector structure may be employed which utilizes a welded connection joint between the cable conductor strands and the pothead connector. In this case only a temporary plug is employed instead of the core support tube. The use of a welded connection eliminates the hydraulic restriction which may be formed by the fluted core support tube.

Referring again to FIG. 1, the flow tube 18 passes upwardly through an aperture in the upper end of the connector 90 and through the cylindrical connector stub 96 to connect to the inlet of the upper valve 34. A suitable opening is provided in the cylindrical wall of the upper portion 97 of the connector stub 96 so that the tube 18 can be brought out in the manner shown.

The power to operate the circulating pump motor is preferably derived from the annular or "doughnut" current transformer 36 which is formed by a coil having a relatively large number of turns wound about an open core through which the connector stub passes so that the coil forms the secondary winding of the transformer, with the conductive connector stub 96 forming the primary. The current produced by the transformer 36 is fed to the electronic control module 38, by leads diagrammatically indicated as 99, from whence appropriate power is supplied to the motor. Although current will only be supplied from the transformer when there is current flow through the termination cable, cooling of the termination is clearly only required under such conditions, and hence the transformer 36 may be readily designed to provide sufficient electrical energy whenever cooling is required. Moreover, the greatest need for cooling occurs when the conductor 14 is carrying a current magnitude near its full load rating, and thus more than sufficient energy will always be obtainable from the transformer to drive the pump motor for meeting any cooling requirements.

Various modes of control of the pump motor may be employed, as desired, by the use of appropriate control circuitry for the module 38 which supplies the operating power to the motor via leads diagrammatically indicated as 101. For example, the output level of the current transformer 36 will generally be a function of the current flow through the connector stub 96 (and the conductor 14), such as an approximately proportional function. Thus, the control module 38 may employ a control circuit of conventional type which defines an input threshold level to provide output power to the pump motor only when the input level is above the threshold. The dynamic cooling system of the present invention would then operate only during the times when the current load on the cable termination was at some predetermined level or higher, such as when it was above the rating for normal (i.e., not internally cooled) ambient temperature operation. Also, once the threshold has been exceeded, the pump speed, and thus the flow rate of the coolant, may be made proportional to the cable current in response to the proportional output of the transformer. This may be readily implemented wherein the control module 38 includes a voltage divider coupled to the transformer output to provide a control signal which is rectified and fed to a threshold defining circuit (employing, e.g., a Schmidt trigger or Zener diode) to supply an output signal only when the input magnitude exceeds the threshold level. A triac switching circuit may then be employed to respond to this output signal for applying the a.c. power from the transformer to the motor through a regulating circuit or otherwise.

Alternatively, the electronic control module 38 may include a clock or other timing device which would operate the circulating pump motor at predetermined time periods which were anticipated to be peak or high load times. Of course, various types of timing circuitry are known which may enable the operation of the dynamic cooling system to be programmed in essentially any desired manner.

Another alternative mode of operation which may be employed with the present system is that of operating the circulating pump motor only upon demand as determined by the actual temperature of the conductor or the surrounding insulating liquid dielectric. For example, a suitable temperature sensing transducer, such as a thermistor or thermocouple device, may be disposed within the insulating liquid dielectric within the cavity 82 to sense the temperature of the conductor in the region of the ferrule 100 against which it may be mounted. The electrical leads from the sensing device may then be brought through the cover plate assembly 68 (with suitable bushings) and connected to the electronic module 38 so that power is supplied to the pump motor only when the temperature being sensed is equal to or above a certain level; or, alternatively, a proportional control may be employed so that the speed of the pump motor, and consequently the flow rate of the insulating liquid through the passages 20 and 22, is varied in proportion to, or in some other systematic correspondence with, the temperature being sensed.

The circuitry of the electronic control module 38 is preferably of the semiconductor thyristor type (e.g., using SCR's or triacs) so as to have relatively low power requirements, while being able to switch and/or control the necessary power for operation of the pump motor. Also, this type of circuitry can be constructed in a relatively small space. Thyristor circuits for controlling the operation of the pump motor in any of the above-mentioned modes, using switching and/or phase-control techniques, can be readily designed by persons skilled in the art based on the teachings hereof, and the basic techniques of such control systems are discussed at length, for example, in the SCR Manual, 4th Edition (1967), published by General Electric Company, Syracuse, New York, as well as in many other publications.

The control module 38 is physically mounted in the pothead hood section on the cover plate 68 by any suitable means and supported by an insulated pedestal, as shown.

The current transformer 36 may be mounted directly on the connector stub 96 by insulation ring 103 within the annular gap defined between the center hole of the transformer and the outer surface of the connector stub. Alternatively, the transformer may be mounted on a support frame (not shown) which may be bolted to the cover plate 88 in any suitable manner. The transformer 36 may be coated or encapsulated with a potting compound to provide protection.

The filter 40, as previously indicated, removes undesirable elements from the coolant such as metal or other particles, which might block or otherwise detrimentally effect the cooling system. It may also remove residual peroxide compounds which may be produced if any of the copper, steel and other catalytic action metals are not effectively "isolated" from the insulating liquid. For example, stainless steel or other suitable tubing may typically be used for the inner flow tube 18 and heat exchange coil 30, and such peroxide compounds may be formed within the insulating liquid coolant. These compounds may tend to increase the power factor of the insulating liquid at high temperatures and high velocity of flow. Hence, removal of such compounds maintains the best dielectric characteristics of the insulating liquid.

Also, since the tube 18, heat transfer coil 30, and the annular space 20 between the tube and the inside of the conductor may be made relatively large, restriction of flow in the closed loop system will not generally pose a problem. Thus, the requirements on the filter 40 will generally not be too high, and a relatively small cleanable or replaceable filter may be used.

In any event, however, it is generally desirable to coat the catalytically active metal parts which may be exposed to the insulating liquid with some non-active metallic or non-metallic material. Hot tinning of the steel, copper or copper alloy parts is one method of effectively "isolating" the insulating liquid from the catalytic action of these metals. Any servicing of the filter and pump may be readily accomplished by isolating the portion of the cooling system 26 at the hood of the pothead from the remainder of the system by closing the valves 32 and 34.

After servicing has been accomplished, and in normal operation, these valves are opened and the circulating insulating liquid would then flow as shown, for example, by the arrows, down through the annular passage 20, below the insulator section of the pothead, to a point near the bottom of the pothead body section where the restriction passages are formed by plug 25. The liquid then flows through the ports 24 and up through the inner flow passage 22 of tube 18 back to the hood section of the pothead, through the connector 90, and the connector stub 96, to the top of the cooling coil 30. The insulating liquid, which at this point will have reached a relatively high temperature from the heat acquired from the conductor, begins to lose its heat as it flows downwardly through the cooling coil 30, as shown by the arrows, and approaches ambient temperature (or somewhat higher) when it enters the intake of the circulating pump 28. In any event, the temperature of the insulating liquid at the bottom of the coil 30 is substantially less than the temperature of the insulating liquid at the top of the coil. The particular flow rate required in the system for any given installation will, of course, be dependent primarily upon the temperature of the ambient air (or other pothead enclosure media), the of the solar radiation incident on the structure, and the time integral of the cable conductor current.

Although the dynamic cooling system, as described thus far, effectively cools most of the cable within the pothead, in some cases there may be a practical limit to the distance from the top of the pothead through which effective cooling may be attained by the cooling means 26 and internal flow passages 20 and 22. As illustrated, for example, in FIG. 2, the cooling passages 20 and 22 in the conductor 14 extend only partially through the pothead body 50. Thus, there may be some portion of the cable near the bottom of the pothead which is not directly cooled by the cooling means 26. In such a situation, at least two alternative general techniques may be employed for independent cooling of this region.

First, as shown in FIG. 2, where the pothead is connected to an oil filled pipe-type cable system which, itself, utilizes a dynamic oil flow, the oil within the riser pipe 44 may be conducted through the base plate about the cable 42, and through a plurality of openings 106, into the interior of the body 50. The openings 106 are relatively large to permit sufficient flow for adequate cooling, and are preferably symmetrically arranged about the shoulder portion of the inner entrance member 56 to promote a relatively uniform flow pattern. As shown by the arrows, the oil flows upwardly through the body 50 into the multiple intake ports of a manifold 108 located near the upper portion of the body, also to promote a relatively uniform flow pattern. The oil then flows within interior chamber 109 of the manifold 108 to the single discharge port 110 and through the main or riser oil system return pipe 112 to a heat exchanger and pumping station (not shown).

An oil baffle cone 114 is mounted on the inner entrance member 56 and extends upwardly, generally parallel with the stress relief cone, at a given distance therefrom, to the insulator support plate 78. The oil baffle cone 114 maintains a relatively static oil pressure condition in the region about the stress relief cone and associated structure, and prevents the flowing oil from eroding the cable and stress relief insulation. Thus, cooling in this region will take place by convection currents in the oil within the baffle cone 114, which will transfer the heat from the cable, through the cone (primarily by conduction), and to the dynamic oil system within the terminator body 50.

The bottom edge of the cone 114 has a skirt portion, as shown, which abuts the annular surface of an adjustment nut 115 which is in threaded engagement with an externally threaded portion of the neck member 56. An oil seal 116 is provided between the cone and neck, just above the threaded portion, and a further oil seal 118 is provided between the upper edge of the cone and the insulator support plate 78. Accordingly, adjustment nut 115 is turned to drive the cone 114 into good sealing engagement at its upper end, while a good seal is maintained at its lower end. Of course, other mechanical arrangements for this purpose may be alternatively employed.

A number of small oil ports 120 in the surface of cone 114 are preferably provided with filters and check valves 122 so that the static pressure of the oil dielectric which impregnates and fills the pothead-termination is maintained at the same high pressure as that of the main cable and riser system, typically being between 200 and 300 psi, without any significant flow therethrough, except as results from temperature expansion or contraction. The oil ports 120, with respectively associated filters and check valves 122, are preferably arranged about the cone surface in a uniformly spaced arrangement, the number being determined as a matter of design for any particular structure and application. Thus, the ports 120 provide communication between the pothead liquid dielectric and the pipe oil system, through the valves and filters.

The cone 114 plus the preferred filters also prevent dirt and other undesirable material typically present in the pipe cable oil system from being deposited on the cable, stress relief insulation, etc., within the pothead structure.

The lead wire from the lower measurement terminal 81 may then be conveniently brought through one of the openings 106, as shown, and wrapped about the cable shielding 46, or it may be brought through the cone (with a suitable bushing), if desired.

A second alternative to such a cooling system for the lower portion of the 200 within the pothead may comprise merely a simple liquid cooled heat exchange sleeve or jacket (not shown) disposed about but isolated from the metal pothead body 50 on the external surface thereof. In utilizing such a system, wherein the pothead is employed with a dynamically cooled pipe system, a riser pipe manifold (not shown) is typically included at the cable entrance to the pothead immediately below the base plate 52. The riser pipe manifold discharges into a return pipe which is connected back to the main cable heat exchanger system and pumping station. Such a riser pipe manifold is shown, for example, in the aforesaid copending application. With the use of such an isolated heat exchange sleeve about the pothead body 50, check valves are normally employed in the ports 106 to maintain the static pressure within the pothead at approximately the pressure of the pipe cable system, i.e., between 200 and 300 psi, and substantially no flow would take place therethrough, except that due to expansion or contraction. Thus, the oil baffle 114 and the manifold 108 with its associated outlet pipe 112, etc., would, of course, be eliminated.

In any case, the pothead body section 50 presents significantly less cooling problems than the insulator section of the termination. Convection currents in the large volume of liquid dielectric carry heat to the outer walls of the metal body 50 where it is transferred to the outside surroundings. Radially projecting vertical vanes 125 increase the rigidity of the cylindrical wall of the body 50, as well as provide increased surface area for heat transfer.

The insulating liquid employed in the cooling system of the present embodiment of the invention may be any mineral or synthetic liquid commonly employed as a dielectric, or typically used in pipe cable systems, having a sufficiently low viscosity to readily flow at the temperatures to which it will be subjected. In the illustrated cable termination, although the portion of the coolant liquid circulating loop that is within the pothead is confined substantially to the interior of the hollow cable conductor 14, some liquid flow may normally take place through the interstices of the hollow core conductor so that there may be intermingling of the coolant insulating liquid with the relatively static liquid dielectric within the pothead. Thus, in the present embodiment, it is desirable that the liquid coolant be identical to the pothead oil and have the same high dielectric strength.

The size or cross-sectional area of the flow passages or ducts may be selected in accordance with the desired cooling capacity of the system as a matter of design, and the size of the tube 18 is preferably chosen to provide equal areas of flow in both axial flow passages.

Although the preferred embodiment provides downward (low temperature) coolant flow in the annular passage adjacent the conductor and upward (high temperature) or exhaust flow within the axial tube, the opposite flow pattern might alternatively be utilized.

The principles of the present invention are also applicable to provide a system for circulating a liquid coolant axially through the cable termination of static high pressure pipe-type cable systems, as well as of the illustrated dynamically cooled pipe-type cable system, and may also be applicable to low or medium pressure systems. And in accordance with these principles, a considerable increase in the current carrying capacity of the cable within the termination is economically achieved without any degradation of the dielectric characteristics of the pothead. Additionally, the dynamically cooled cable termination herein described provides high reliability through the self-contained and self-controlled features which may be employed.

The system of the present embodiment of the invention is shown in conjunction with a high voltage capacitor graded pothead, such as in the 230 KV. to 500 KV. range, but it is of course applicable to various other voltage classes and types of cable terminations or potheads.

Although a preferred embodiment of the present invention has been illustrated and described, it is understood that various modifications will be apparent to those skilled in the art; and accordingly, the scope of the invention should be defined only by the appended claims and equivalents thereof.

Various features of the invention are set forth in the following claims.

What is claimed is:

1. A dynamic cable termination cooling system comprising a pothead having an outer insulator, a hollow cable conductor extending along the pothead axis, and insulation disposed about said cable conductor and within said outer insulator, a tube disposed within said hollow conductor defining an annular space between the tube and said conductor, said annular space forming a first flow passage and the interior of said tube forming a second flow passage, a port in said tube communicating between said first and second flow passages at one end thereof, and means coupled to said annular space and to said tube at the other respective ends of said flow passages defining a loop for the circulation of a coolant liquid through said first and second passages, the portion of said loop within said pothead being confined substantially to the interior of said hollow cable conductor, and said means including a pump and heat transfer means for cooling said liquid.

2. The system of claim 1 wherein said heat transfer means comprises a coiled tube coupled between said first and second flow passages, and said coiled tube is disposed at the normally high voltage end of said pothead.

3. The system of claim 2 wherein said coiled tube is in direct heat transfer relation to the ambient air.

4. The system of claim 1 wherein said pump coupled in said loop is disposed at the normally high voltage end of said pothead.

5. The system of claim 4 comprising an electric driving motor coupled to said pump, and means for deriving electrical energy from said conductor for energizing said motor.

6. The system of claim 5 wherein the pothead includes terminal means located at the normally high voltage end thereof and extending externally therefrom, said terminal means being electrically connected to said conductor, and said means for deriving electrical energy comprises a current transformer coupled to said terminal means.

7. The system of claim 6 wherein said terminal means comprises a cylindrical connector member axially disposed at the normally high voltage end of said pothead, and said current transformer includes an annular coil concentrically disposed about said connector member.

8. The system of claim 1 wherein said pothead includes a metal body portion at the normally grounded end thereof, and said first and second flow passages extend to a predetermined point along the hollow conductor within said body portion.

9. The system of claim 8 wherein further means are provided for cooling the portion of the hollow conductor within said pothead body portion located beyond said predetermined point, said further means being independent of said loop.

10. The system of claim 8 for use with an oil filled pipe cable system, said system comprising means for conducting the pipe oil through said pothead body portion.

11. The system of claim 10 wherein stress relief insulation is provided about said conductor within said body portion, and an oil baffle is disposed about said stress relief insulation and at least coextensive therewith along the axis of the pothead within said body portion 12. The system of claim 11 wherein said insulation is impregnated with an insulating liquid dielectric of the pothead, said system comprising a valve and filter coupled to a port in said baffle for communication between the pothead liquid dielectric and the pipe oil.

13. A dynamically cooled pothead for use with a hollow core cable, the cable conductor extending along the pothead axis, said pothead comprising an outer insulator, insulation disposed about said cable conductor and within said outer insulator, a tube disposed within the conductor core defining an annular space between the tube and said conductor, said annular space forming a first flow passage and the interior of said tube forming a second flow passage, a port in said tube communicating between said first and second flow passages at one end thereof, and means coupled to said annular space and to said tube at the other respective ends of said flow passages for circulating an insulating liquid dielectric through a loop including said first and second flow passages, said means including a pump and heat transfer means for cooling said liquid, said pump and heat transfer means being disposed at the normally high voltage end of the pothead and said heat transfer means being in direct heat transfer relation to the surrounding ambient.

14. The pothead of claim 13 wherein said heat transfer means comprises a coiled tube coupled between said first and second flow passages.

15. The pothead of claim 14 comprising an electric driving motor coupled to said pump and means for deriving electrical energy from said conductor for energizing said motor.

16. The pothead of claim 15 wherein in the pothead includes terminal means located at the normally high voltage end thereof and extending externally therefrom, said terminal means being electrically connected to said hollow conductor, and said means for deriving electrical energy comprises a current transformer coupled to said terminal means.

17. The pothead of claim 16 wherein said means for deriving electrical energy further comprises a control circuit for controlling the application of power to said motor in accordance with a predetermined mode of operation.

18. The pothead of claim 13 wherein said circulating means includes a filter in said loop for maintaining the dielectric qualities of said insulating liquid.

19. The pothead of claim 18 wherein said filter is disposed at the normally high voltage end of said pothead.

* * * * *

UNITED STATES PATENT OFFICE
CERTIFICATE OF CORRECTION

Patent No. 3,716,652     Dated February 13, 1973

Inventor(s) George E. Lusk and James H. Nicholas

It is certified that error appears in the above-identified patent and that said Letters Patent are hereby corrected as shown below:

Column 2, line 56, "contained" should be --contain--

Column 5, line 26, delete --by-- from sentence

Column 5, line 39, "where" should be --wherein--
                   "potion" should be --portion--

Column 11, line 62, "200" should be --cable--

Signed and sealed this 20th day of November 1973.

(SEAL)
Attest:

EDWARD M. FLETCHER, JR.                RENE D. TEGTMEYER
Attesting Officer                      Acting Commissioner of Patents